United States Patent Office 3,444,117
Patented May 13, 1969

3,444,117
POLYMER BLEND
John J. Higgins and Nova E. Stucker, Westfield, N.J., assignors to Esso Research and Engineering Company, a corporation of Delaware
No Drawing. Filed Apr. 6, 1966, Ser. No. 540,533
Int. Cl. C08f 29/06
U.S. Cl. 260—28.5                                  9 Claims

ABSTRACT OF THE DISCLOSURE

A blend of atactic polypropylene, low molecular weight polybutene and an isobutylene polymer provides an improved polymer blend which may be used in such applications as wax blend formulations, hot melt adhesives, and asphalt compositions.

---

This invention relates to a novel elastomeric material serving as a base for the production of adhesives, mastics and sealants. More specifically, it relates to a blend of atactic polypropylene, low molecular weight polybutene and an isobutylene polymer, which blend is a valuable intermediate for the formation of adhesives, sealants, and the like.

It is known in the art to use butyl rubber in sealant and adhesive applications because of the rubber's flexibility, good tack, and outstanding aging and weathering resistance. However, butyl rubber cannot easily be blended with other materials because of its inherent toughness, and therefore it is necessary to use expensive, sophisticated, high shear mixing equipment to break down the tough polymer bales. Additionally, very large amounts of solvents must be used to plasticize butyl mastics and caulks. Subsequently, the solvent evaporation leads to excessive shrinkage of the caulking or mastic materials. It has now been found that these problems may be avoided if there is substituted for the butyl a blend of an atactic polypropylene, low molecular weight bolybutene, and an isobutylene polymer. This blend has superior physical properties, is easily processed in the absence of solvent and is highly extendible.

The blend of the present invention is produced by mixing together about 10–40 weight percent, preferably about 25% of a substantially atactic polypropylene, with 20–80 weight percent, preferably about 50 weight percent, of a low molecular weight polybutene, and 10–40 weight percent, preferably about 25 weight percent, of an isobutylene polymer. The blended material comprises a composition which has many uses. For example, it may be mixed with an organic solvent, such as toluene and used as a pressure-sensitive adhesive. It may also be used with wax or paraffin as a hot melt adhesive. It may further be used to produce caulking compounds and rubberized asphalts.

The polypropylene which is used for the invention is a substantially atactic (i.e. amorphous) polymer. This polymer is produced, for example, under low pressure conditions with the aid of a Ziegler-type polymerization catalyst. The amorphous polypropylene should have a viscosity of between about 1000–50,000 centipoises (190° C. Brookfield). The polypropylene may contain a small amount of crystallinity, i.e., suitably less than 10%, but it is preferred that it contain substantially no crystallinity.

The polybutene which is useful in this invention, is a low molecular weight polymer of butene which has a consistency varying from liquid to semi-solid. The molecular weight of the polybutene should be in the range of about 300–3000 (as determined by Mecrolab Osmometer).

The isobutylene polymer which is useful in this invention, is either Vistanex, a homopolymer of isobutylene; or an isobutylene based butyl rubber. Butyl rubber is prepared by copolymerizing isobutylene with a minor amount of a $C_4$ to $C_{10}$ diolefin such as isoprene or butadiene. The preparation of butyl rubber, and its composition, is described in Patent No. 2,356,128 issued to Sparks and Thomas. The molecular weight of the isobutylene polymer is not critical to this invention, although it is preferred that the polymer have a Staudinger molecular weight of between about 30,000 and 200,000.

The blend of this invention may be solvated with hydrocarbon or chlorinated hydrocarbon diluents of a very wide variety. Illustrative of these are hexane, toluene, benzene, cyclohexane, chlorobenzene, xylene, and mineral spirits. Solvents containing oxygen, such as acetone or isopropyl alcohol are not useful. In the production of pressure-sensitive adhesives, about 20 to 80 volume percent of solvent is used based on the total volume of polymer blend.

The blends of this invention may also be used in wax blend formulations for use as hot melt adhesives and coatings. Thus, they may be blended in any proportion with paraffin or microcrystalline wax for such purposes. The elastomer blend-wax formulation is highly compatible and has a low viscosity which minimizes processing difficulties. Additionally, it has superior properties as an adhesive or a coating.

The blends of this invention can also be mixed with any proportion of asphalt to produce rubberized asphalts having superior low temperature ductility and excellent impact strength. Asphalt containing 2 to 20% of the blends are of greatest economic interest.

Excellent caulking compounds may be produced by mixing the blends of this invention with conventional proportions of tackifying resins such as steam cracked petroleum resins, or hydrogenated rosins; and fillers such as whitings and clays.

Fillers such as the whitings and clays noted above, or silicas, carbon black, etc., may be incorporated in any of the formulations for which the blends of this invention are employed in order to modify the properties of the product obtained. Additionally, processing aids such as antioxidants may be incorporated in the formulations.

The invention may be more fully understood by reference to the following examples.

EXAMPLE 1

The blend of this invention was prepared by mixing the following polymers in a kneader:

| Material: | Parts by weight |
|---|---|
| Atactic polypropylene (no crystallinity; number average molecular weight ~3000) | 1 |
| Butyl rubber (copolymer of about 98.5 weight percent isobutylene and about 1.5 weight percent isoprene; Staudinger molecular weight about 44,000) | 1 |
| Polybutene (molecular weight about 890 by Mecrolab Osmometer) | 2 |

After kneading for 180 minutes with slow addition of the polybutene, a tough, tacky, viscous material was formed with the following properties:

| | |
|---|---|
| Specific gravity | 0.90. |
| Volatiles at 105° C., percent by weight | <0.30. |
| Ash content, percent by weight | <0.50. |
| Color | Amber. |
| Solubility | Miscible with hydrocarbon or chlorinated hydrocarbon solvents. |

EXAMPLE 2

Formulations of the polymer blend with waxes are useful to produce hot melt adhesives and coatings.

Wax blends were made using the polymer blend of Example 1 and two typical waxes, a paraffin (Essowax #5010, a 151° F. melting point distilled paraffin) and a microcrystalline wax (Mikrovan 1750, petrolatum melting point 175° F.). The solutions were prepared in a Beken mixer steam heated to 200° F. Samples of each blend were allowed to cool and were then placed in ovens at three test temperatures (212° F., 250° F., and 300° F.) without agitation. These samples were examined at 16 and 64 hours.

The compatibility was excellent since the blends showed no signs of separation or decomposition. The solutions were clear of haze, and stirring by hand did not reveal a second layer of material. The predominant odor was that of the base wax and no change in odor or color was noticed even when stored at 300° F. The viscosity of the wax blends increased in a regular manner with increasing polymer content. For an elastomeric additive, the increase in viscosity was very slight and this property constitutes a major processing advantage for this intermediate product.

Large concentrations of additive can be used with only minor changes in the flow and handling properties of the base wax. The good compatibility and low viscosity also reduced the necessary blending time. Starting with the wax and the intermediate (i.e., the polymer blend of Example 1) at room temperature in a one-gallon Beken mixer, the molten wax-polymer blend was visually homogeneous within 30 minutes, and was dumped within 45 minutes.

TABLE I.—WAX BLENDS

| | In paraffin at— | | | In microwax at— | | |
|---|---|---|---|---|---|---|
| | 1% | 10% | 50% | 1% | 10% | 50% |
| Compatibility | ← Good, all solutions haze free, clear → | | | | | |
| Viscosity (cps. at 250° F.) | 7 | 30 | 8,500 | 22 | 75 | 20,000 |
| Odor (at 300° F.) | None | None | V. slight | None | None | V. slight |
| Color | Lt. yellow → | | Lt. carmel | Lt. yellow → | | Lt. carmel |
| Blending time | ← Fast and easy to blend → | | | | | |

EXAMPLE 3

Another hot melt application where rubber based additives have proven effective is in asphalt based adhesives and sealers. Rubberized asphalts generally have better low temperature ductility, better impact strength and better temperature susceptibility than their nonmodified counterparts. The blend of this invention imparts the advantages of rubber to asphalt but is much easier to incorporate. As shown in Table II, with a standard propeller type mixer, five minutes at 300° F. was sufficient to blend in the product of Example 1, while one hour at 350° F. was necessary for another proprietary rubber compound sold for this use. Prolonged exposure to 350° F. temperatures can severely degrade the asphalt, thus the ease with which the blend of this invention can be processed avoids such degradation.

These data show that blending was very easily accomplished and that low temperature ductility and temperature susceptibility were improved. From an application standpoint, neither the softening point nor viscosity increase was excessive. Other tests have indicated that the blends of this invention greatly increase the flexural strength of conventional, pourable, asphalt mixes.

EXAMPLE 4

Valuable caulking compounds can be made with the blends of this invention. A typical formulation is shown below:

| Material: | Parts by weight |
|---|---|
| Polymer blend of Example 1 | 200 |
| Piccopale 100 [1] | 15 |
| Button 100 [2] | 50 |
| Hercolyn [3] | 8.5 |
| Denatured alcohol | 1.3 |
| Bentonite [4] | 25 |
| Atomite whiting [5] | 400 |
| Talc | 100 |
| Butile $TiO_2$ | 50 |

[1] Petroleum resin having 100° F. melting point.
[2] Low Molecular weight butadiene-styrene copolymer.
[3] Methyl ester of hydrogenated rosin having viscosity of 28–34 cps. at 25° C.
[4] Bentonite clay.
[5] Powdered calcium carbonate.

The formulation was mixed directly in a kneader; no mills or high shear mixing equipment were required. Shrinkage was held to a minimum since it was not necessary to incorporate large amounts of solvent. Excellent adhesion of the resulting caulk to a variety of building substrates was obtained.

This invention has been described in connection with certain specific embodiments thereof; however, it is to be understood that these are by way of example and not by way of limitation, and it is not intended that the invention be restricted thereby.

What is claimed is:

1. A composition comprising a blend of about 10–40 weight percent of substantially atactic polypropylene, 20–80 weight percent of polybutene having a molecular weight in the range of about 300–3,000, and 10–40 weight percent of an isobutylene polymer having a molecular weight of between about 30,000 and 200,000, selected from the class consisting of polyisobutylene and an isobutylene based butyl rubber.

2. The composition of claim 1 wherein the isobutylene polymer is polyisobutylene.

3. The composition of claim 1 wherein the isobutylene polymer is butyl rubber, a copolymer of isobutylene with a minor amount of a $C_4$ to $C_{10}$ diolefin.

4. The composition of claim 1 containing about 25 weight percent of polypropylene, 50 weight percent of polybutene and 25 weight percent of the isobutylene polymer.

TABLE II.—MODIFIED ASPHALTS [1]

| Additive | Blending required | Additive content (percent) | Penetration at 77° F. | Softening point, °F. | Ductility at 39.2° F. (cm.) | Viscosity at 275° F. SFS | Penetration Index [2] |
|---|---|---|---|---|---|---|---|
| Blend of Example 1 | 5 min. at 300° F. | 0 | 92 | 112 | 9 | 152 | −1.2 |
| | | 5 | 86 | 120 | 9.5 | 283 | −0.1 |
| | | 10 | 79 | 131 | 11 | 738 | +1.2 |
| Commercial elastomeric additive [3] | One hour at 350° F. | 0 | 59 | 122 | 8 | 199 | −0.8 |
| | | 5 | 53 | 127 | 7.5 | 403 | −0.3 |
| | | 10 | 56 | 132 | 7 | 718 | +0.4 |

[1] 85–100 Penetration asphalt.
[2] Penetration Index is a measure of the temperature susceptibility of a binder and depends on the softening point and penetration relative to one another. The higher the penetration index the better the temperature susceptibility.
[3] Ramflex V-17; a special process reclaim rubber in a black, free flowing, asphalt soluble form. Density is 1.14 to 1.16, bulk density 14–16 lbs./ft.³, particle size is 100% through 10 mesh and 80% through 20 mesh screen.

5. The composition of claim 4 wherein the isobutylene polymer is butyl rubber, a copolymer of isobutylene with a minor amount of a $C_4$ to $C_{10}$ diolefin.

6. The composition of claim 5 which is blended with asphalt.

7. The composition of claim 5 which is blended with wax.

8. The composition of claim 5 to which has been added a hydrocarbon or chlorinated hydrocarbon solvent.

9. The composition of claim 5 which is blended with a tackifying resin and filler to produce a caulking compound.

References Cited

UNITED STATES PATENTS

| | | |
|---|---|---|
| 2,131,342 | 9/1938 | Baldeschwieler. |
| 2,202,363 | 5/1940 | Wiezevich. |
| 2,572,458 | 10/1951 | Eustis. |
| 2,909,498 | 10/1959 | Sayko. |
| 2,939,860 | 6/1960 | Schramm. |
| 3,012,016 | 12/1961 | Kirk et al. |
| 3,046,238 | 7/1962 | Ridenour. |
| 3,139,412 | 6/1964 | Sterling. |
| 3,144,423 | 8/1964 | Belak et al. |
| 3,258,319 | 6/1966 | Cox. |
| 3,262,997 | 7/1966 | Edwards et al. _____ 260—889 |

FOREIGN PATENTS 850,568  10/1960  Great Britain.

MORRIS LIEBMAN, *Primary Examiner.*

JOHN E. TERMINI, *Assistant Examiner.*

U.S. Cl. X.R.

260—33.6, 33.8, 41.5, 889